US008159577B2

(12) United States Patent
Iwata et al.

(10) Patent No.: US 8,159,577 B2
(45) Date of Patent: Apr. 17, 2012

(54) SOLID-STATE IMAGING APPARATUS WITH DECODERS FOR CONTROLLING RESET SWITCHES

(75) Inventors: Koichiro Iwata, Ebina (JP); Tetsuya Itano, Zama (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 12/267,834

(22) Filed: Nov. 10, 2008

(65) Prior Publication Data

US 2009/0122172 A1    May 14, 2009

(30) Foreign Application Priority Data

Nov. 13, 2007  (JP) .................................. 2007-294438

(51) Int. Cl.
*H04N 3/14*       (2006.01)
*H04N 5/335*      (2011.01)
(52) U.S. Cl. .......................... 348/296; 348/308; 348/319
(58) Field of Classification Search ............... 348/240.2, 348/316, 319, 321, 323, 308, 296
See application file for complete search history.

(56) References Cited

U.S. PATENT DOCUMENTS

| 5,894,325 | A | 4/1999 | Yonemoto | 348/302 |
| 6,847,398 | B1 * | 1/2005 | Fossum | 348/296 |
| 6,856,349 | B1 * | 2/2005 | Trevino | 348/302 |
| 6,933,973 | B1 * | 8/2005 | Sako | 348/308 |
| 7,336,311 | B2 * | 2/2008 | Pearson | 348/302 |
| 7,355,643 | B2 * | 4/2008 | Shimomura et al. | 348/294 |
| 7,460,162 | B2 | 12/2008 | Koizumi et al. | 348/294 |
| 7,462,810 | B2 | 12/2008 | Kobayashi et al. | 250/208.1 |
| 7,511,752 | B2 * | 3/2009 | Kurane | 348/296 |
| 7,746,399 | B2 * | 6/2010 | Itoh et al. | 348/302 |
| 7,782,376 | B2 * | 8/2010 | Yoneda et al. | 348/240.2 |
| 2004/0119863 | A1 * | 6/2004 | Cho | 348/308 |
| 2004/0212707 | A1 * | 10/2004 | Itoh et al. | 348/294 |
| 2004/0252213 | A1 * | 12/2004 | Itoh et al. | 348/308 |
| 2005/0057673 | A1 | 3/2005 | Shimomura et al. | 348/294 |
| 2005/0062867 | A1 * | 3/2005 | Mabuchi | 348/308 |
| 2006/0007337 | A1 * | 1/2006 | Panicacci | 348/308 |
| 2006/0238633 | A1 | 10/2006 | Kinugasa et al. | 348/300 |
| 2007/0115377 | A1 | 5/2007 | Noda et al. | 348/294 |
| 2007/0195182 | A1 * | 8/2007 | Ito | 348/308 |
| 2008/0030612 | A1 | 2/2008 | Itano et al. | 348/340 |
| 2008/0036890 | A1 | 2/2008 | Yamashita et al. | 348/308 |
| 2008/0036891 | A1 | 2/2008 | Ono et al. | 348/308 |
| 2008/0158403 | A1 | 7/2008 | Itano et al. | 348/308 |

(Continued)

FOREIGN PATENT DOCUMENTS

JP           08-336076 A       12/1996

(Continued)

*Primary Examiner* — John Villecco
(74) *Attorney, Agent, or Firm* — Fitzpatrick, Cella, Harper & Scinto (57) ABSTRACT

A solid-state imaging apparatus includes: a pixel region including a plurality of pixels, each including a photoelectric conversion element, arranged in matrix, and a reset switch for discharging electric charge of the photoelectric conversion element; and a first scanning circuit for supplying a reset control signal for controlling an operation of the reset switch, the pixel region and the first scanning circuit being formed on a semiconductor substrate, in which the pixel region includes a first pixel region and a second pixel region, and the first scanning circuit includes a first decoder for controlling the operation of the reset switch arranged in the first pixel region, and a second decoder for controlling the operation of the reset switch arranged in the second pixel region.

14 Claims, 9 Drawing Sheets

U.S. PATENT DOCUMENTS

| | | | |
|---|---|---|---|
| 2008/0211950 A1 | 9/2008 | Ono et al. | 348/308 |
| 2009/0015699 A1 | 1/2009 | Watanabe et al. | 348/308 |
| 2009/0109312 A1* | 4/2009 | Noda et al. | 348/304 |
| 2009/0128675 A1* | 5/2009 | Okano et al. | 348/294 |
| 2009/0153711 A1* | 6/2009 | Lee | 348/302 |
| 2010/0201856 A1* | 8/2010 | Hayashi et al. | 348/296 |

FOREIGN PATENT DOCUMENTS

| | | | |
|---|---|---|---|
| JP | 2005-094142 A | | 4/2005 |
| JP | 2005191814 A | * | 7/2005 |

* cited by examiner

SOLID-STATE IMAGING APPARATUS WITH DECODERS FOR CONTROLLING RESET SWITCHES

BACKGROUND OF THE INVENTION

1. Field of the Invention

The present invention is related to a solid-state imaging apparatus.

2. Description of the Related Art

Conventionally, amplification type solid-state imaging apparatuses are known in technical fields, in which photoelectric conversion elements and amplifying units are included in pixels, while the amplifying units amplify signals produced based upon electric charges of the photoelectric conversion elements. Among the above-mentioned amplification type solid-state imaging apparatuses, general structures thereof are constructed by providing transfer switches and reset switches in input portions of the amplifying units, while the transfer switches transfer electric charges of the photoelectric conversion elements, and the reset switches reset the input portions of the amplifying units.

As a solid-state imaging apparatus having an electronic shutter function, Japanese Patent Application Laid-Open No. H08-336076 has disclosed such a structure which includes a vertical scanning circuit for controlling transfer switches, and another vertical scanning circuit for controlling reset switches. In the above-mentioned solid-state imaging apparatus having the electronic shutter function of Japanese Patent Application Laid-Open No. H08-336076, the scanning operation of the reset scanning-type vertical scanning circuit is performed at a certain time, whereby the respective pixels are reset. Thereafter, since the scanning operation of the transfer scanning type vertical scanning circuit is performed at another time, an accumulation time period, namely, a shutter time period can be determined (namely, electronic shutter).

Also, Japanese Patent Application Laid-Open No. 2005-094142 has disclosed an arrangement in which reset scanning circuits capable of performing resetting operations two times within 1 frame have been arranged in a dual system in order to solve such a problem that when a scaling factor is switched during electronic zooming in a structure for performing an electronic shutter, exposure time periods are different from each other every row.

However, in the dual system arrangement of Japanese Patent Application Laid-Open No. 2005-094142, there is such a problem that the circuit scale of the reset vertical scanning circuit is increased. The reset scanning circuits arranged in the dual system are alternately operated every time a timing signal is output from a timing control unit. As a consequence, it is required to construct that both the reset scanning circuits arranged in the dual system can access with respect to all rows of pixel regions. Both the reset scanning circuits capable of accessing all of those rows are arranged, and hence the circuit scale is increased, and the chip area is increased. Otherwise, a degree of freedom as to an element layout is decreased. In some cases, the above-mentioned accessible arrangement of the reset scanning circuit may conduct that an area of pixel regions is decreased.

The present invention has been made to solve the above-mentioned problems, and has an object to provide such a solid-state imaging apparatus capable of performing reset scanning a plurality of times within 1 frame without increasing a circuit scale of the solid-state imaging apparatus.

SUMMARY OF THE INVENTION

In order to achieve the above-mentioned object, a solid-state imaging apparatus according to one aspect of the present invention includes: a pixel region including a plurality of pixels, each including a photoelectric conversion element, arranged in matrix, and a reset switch for discharging electric charge of the photoelectric conversion element; and a first scanning circuit for supplying a reset control signal for controlling an operation of the reset switch, the pixel region and the first scanning circuit being formed on a semiconductor substrate, in which the pixel region includes a first pixel region and a second pixel region, and the first scanning circuit includes a first decoder for controlling the operation of the reset switch arranged in the first pixel region, and a second decoder for controlling the operation of the reset switch arranged in the second pixel region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

(a), (b), (c) and (d) of FIG. 5 are timing charts for indicating transitions as to both timing and count values of electronic shutter operation of the solid-state imaging apparatus according to the first embodiment.

(a), (b), (c) and (d) of FIG. 6 are timing charts for indicating transitions as to both timing and count values of electronic shutter operation of a solid-state imaging apparatus according to a second embodiment of the present invention.

(a), (b), (c), (d) and (e) of FIG. 9 are timing charts for indicating transitions as to both timing and count values of electronic shutter operation of the solid-state imaging apparatus according to the third embodiment of the present invention.

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Figure 1:
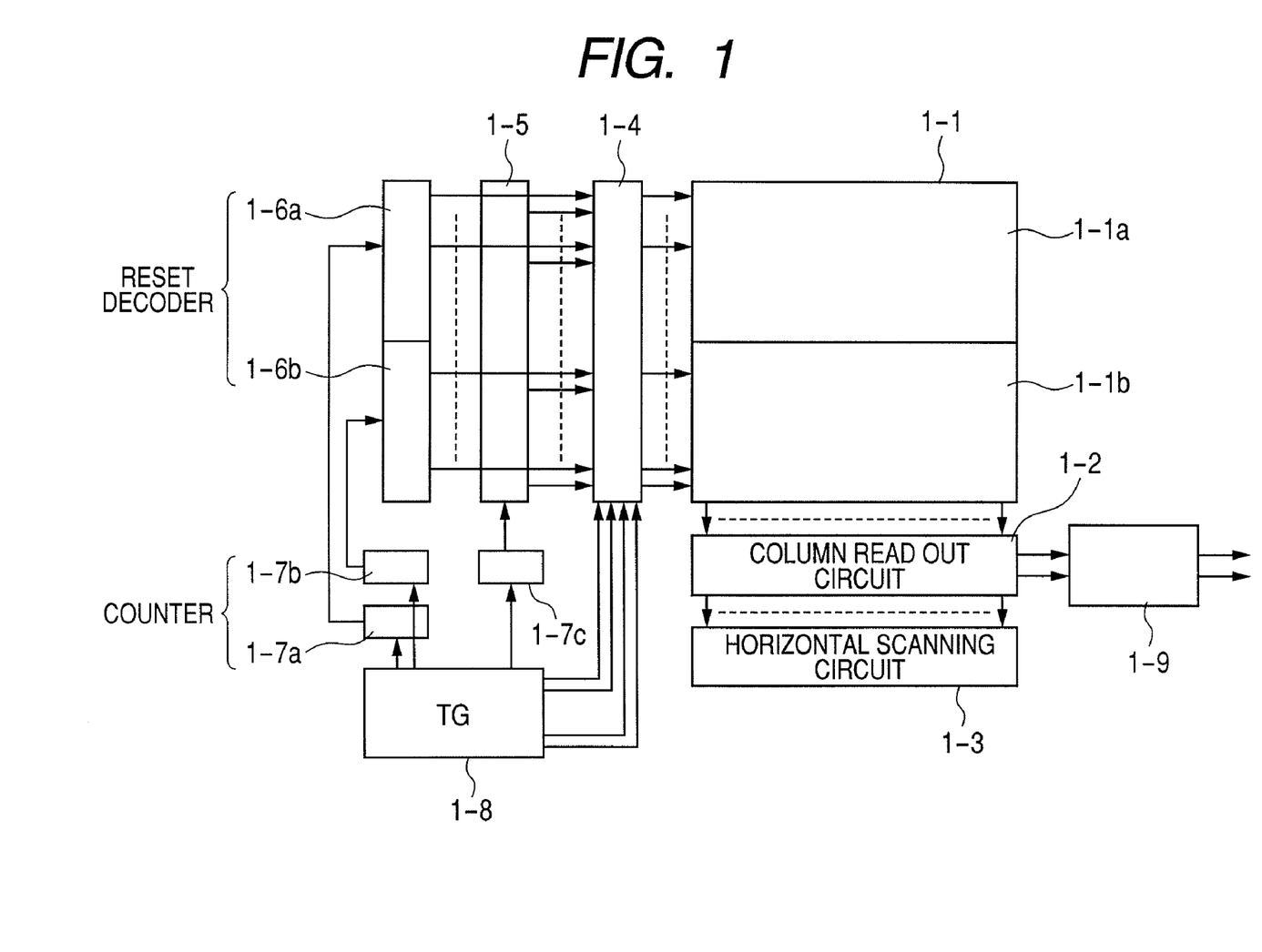
FIG. 1 schematically illustrates an entire structure of a solid-state imaging apparatus according to a first embodiment of the present invention.

FIG. 1 is a conceptional diagram for illustrating a structure of a solid-state imaging apparatus according to a first embodiment of the present invention. Reference numeral 1-1 indicates a pixel region in which a plurality of photoelectric conversion elements and a plurality of switches (reset switches) for discharging electric charges of the photoelectric conversion elements are arranged in matrix. The above-mentioned pixel region 1-1 includes a first pixel region 1-1a and a second pixel region 1-1b.

In order to perform electronic shutter operation, the pixel region 1-1 is required to include at least the reset switches. Since the electric charges of the photoelectric conversion elements are discharged by the reset switches at arbitrary switching timing, a start of an accumulation time period can be defined. Alternatively, in addition to the reset switches, the pixel region 1-1 may include an amplifying unit for amplifying signals produced based upon the electric charges of the photoelectric conversion elements, and transfer switches for transferring the electric charges of the photoelectric conversion elements to an input portion of the amplifying unit. The transfer switches are provided in correspondence with the respective photoelectric conversion elements, whereas the amplifying unit may be provided with respect to each of those photoelectric conversion elements, or may be provided every plurality of sets of the photoelectric conversion elements.

A read-out circuit 1-2 reads out a signal derived from the pixel region 1-1. For instance, the read-out circuit 1-2 includes amplifiers (column amplifiers), a CDS circuit, and the like. For instance, the column amplifiers are provided every pixel column.

A horizontal scanning circuit 1-3 sequentially reads signals to which a predetermined processing has been carried out by the read-out circuit 1-3. An output amplifier 1-9 amplifies the signals sequentially read out by the horizontal scanning circuit 1-3, and then, outputs the amplified signals.

Decoders 1-6a and 1-6b generate electric charge reset pulses which are utilized in order to discharge electric charges of the photoelectric conversion elements. A vertical scanning circuit (first scanning circuit) includes the first decoder 1-6a and the second decoder 1-6b. The vertical scanning circuit supplies reset control signals which are employed so as to scan the reset switches. The first decoder 1-6a scans pixel rows arrayed in the first pixel region 1-1a, whereas the second decoder 1-6b scans pixel rows arrayed in the second pixel region 1-1b. In this case, the first and second pixel regions 1-1a and 1-1b need not be arranged in such a manner that pixel regions are clearly separated from each other, but may be alternatively arranged based upon sets of pixel rows which are scanned by the first decoder 1-6a and the second decoder 1-6b respectively.

Reference numerals 1-7a, 1-7b, and 1-7c indicate counters. Those counters 1-7a, 1-7b, and 1-7c are provided in correspondence with the first decoder 1-6a, the second decoder 1-6b, and a read-out decoder 1-5 (will be discussed later), respectively.

Reference numeral 1-5 denotes an electric charge read-out decoder with respect to the photoelectric conversion elements. Another vertical scanning circuit (second scanning circuit) includes the read-out decoder 1-5 for supplying transfer control signals for controlling operations of the transfer switches. The decoder 1-5 is controlled by the counter 1-7c.

Reference numeral 1-4 denotes a logic circuit. Output signals of the decoders 1-5, 1-6a, 1-6b, and also a control pulse generated from a timing generator (TG) 1-8 are input to the logic circuit 1-4 in order to produce the above-mentioned reset control signal and transfer control signal. The logic circuit 1-4 constitutes a portion of the above-mentioned first scanning circuit and second scanning circuit.

Reference numeral 1-8 denotes a timing generating circuit. The counters 1-7a to 1-7c are controlled, whereby the timing generating circuit 1-8 functions as a control circuit for controlling timing based upon count values to be supplied to the decoders 1-6a and 1-6b. This control circuit is arranged in such a manner that at least only a structure thereof for generating a timing pulse is arranged on the same semiconductor substrate as the pixel region 1-1. Then, functions of this control circuit, which define a reading out region within the pixel region 1-1 and an accumulation time period (will be discussed later) may be alternatively provided as a separate body.

The above-mentioned structural elements are formed on the semiconductor substrate in a monolithic manner. As previously described, a portion of the timing generating circuit (TG) 1-8 may be alternatively constructed as a separate body.

Figure 2:
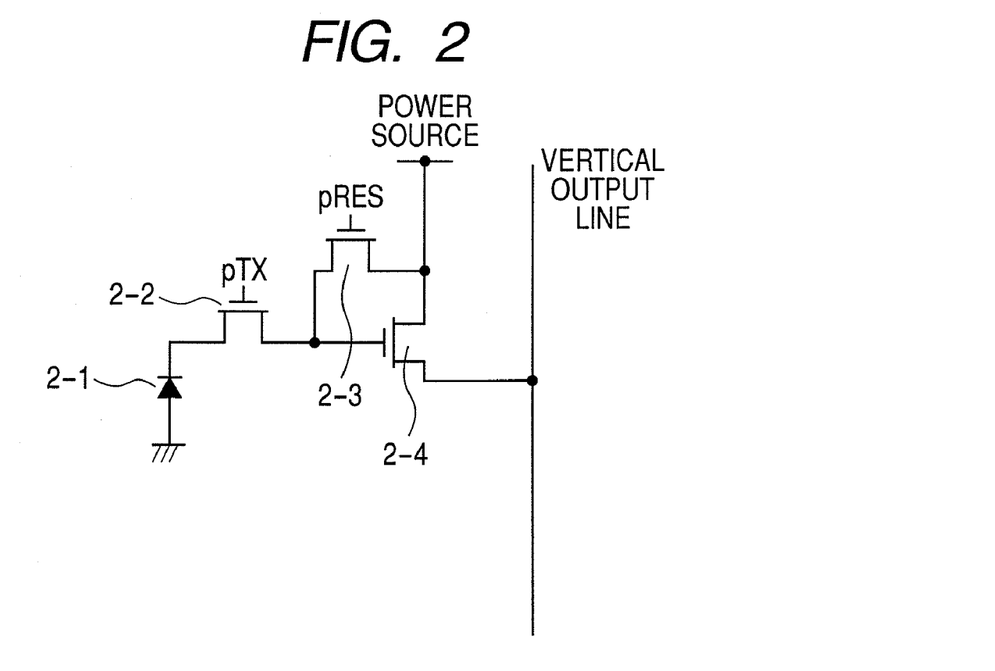
FIG. 2 is an equivalent circuit diagram of a unit pixel of the solid-state imaging apparatus of the first embodiment.

FIG. 2 indicates an example as to an equivalent circuit of a unit pixel arranged in the pixel region 1-1. In this example, the unit pixel includes a photoelectric conversion element and a reset switch, and in addition thereto, includes the above-mentioned amplifying unit and transfer switch.

In FIG. 2, a photoelectric conversion element 2-1 performs a photoelectric conversion and, for example, a photodiode (PD) may be employed. Reference numeral 2-4 represents a portion of an amplifying unit for amplifying a signal produced based upon electric charges generated by the photoelectric conversion element 2-1. More specifically, the amplifying unit 2-4 corresponds to a source follower circuit including a MOS transistor, while the MOS transistor converts an electric charge transferred to a gate of this MOS transistor into a voltage. As a consequence, the gate of the MOS transistor may also function as an input portion of the amplifying unit. Further, the gate of the amplifying-purpose MOS transistor is electrically connected to a floating diffusion region (FD) arranged on the semiconductor substrate.

A transfer switch 2-2 reads out electric charges of the photodiode (PD) 2-1 to the input portion of the amplifying unit. As the transfer switch 2-2, a MOS transistor may be employed, while a pulse pTX is applied to a gate of this MOS transistor, and the gate thereof becomes a control electrode.

A reset switch 2-3 discharges electric charges of the photoelectric conversion element 2-1. As the reset switch 2-3, a MOS transistor can be employed, while a pulse pRES is applied to a gate of the MOS transistor, and the gate thereof becomes a control electrode. In response to the pulse pRES, an operation of the reset switch 2-3 is controlled.

Figure 3A:
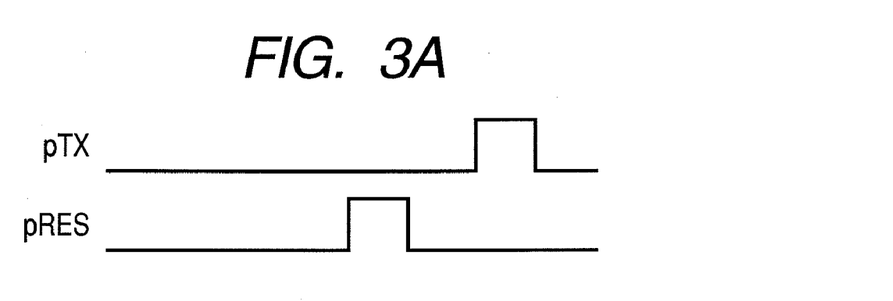
FIGS. 3A and 3B represent pulse waveforms when resetting operation and reading out operation are performed in the first embodiment.
Figure 3B:
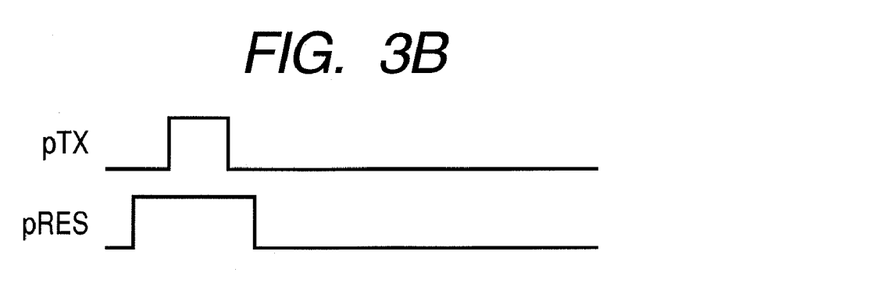

FIG. 3A and FIG. 3B represent waveforms of pulses which are supplied to the transfer switch and the reset switch in a reading out operation and a resetting operation in the first embodiment. Both the transfer switch and the reset switch become active in response to a High status pulse, whereby the switches are enabled.

FIG. 3A is a pulse diagram of such a reading out operation that an arbitrary pixel row is selected by the read-out decoder 1-5 so as to perform the reading out operation. Firstly, the pulse pTX is under Low status, and the pulse pRES becomes a High status. As a result, a potential at the input portion of the amplifying unit is reset. Then, a signal having this status is read out from the pixel region 1-1, and the read signal is held as a noise signal of the pixel, if necessary. Next, after the status of the pulse pRES is brought into a Low status, the status of the pulse pTX is brought into a High status and the electric charge of the photoelectric conversion element is transferred to the input portion of the amplifying unit. Then, the signal having this status is read out from the pixel region 1-1, and if required, a difference processing between the read signal and the above-mentioned noise signal is carried out, thereby obtaining a signal of 1 pixel. In other words, in this example, the reading out operation implies such a reading out operation that the electric charges of the photoelectric conversion element are transferred to the input portion of the amplifying unit, and then, the amplified signal is read out from the pixel region 1-1.

FIG. 3B indicates waveforms of pulses when a resetting operation is carried out. Firstly, the signal level of the pulse pRES becomes High, and under this condition, the signal level of the pulse pTX becomes High. When the above-mentioned operation is carried out, the electric charges of the photoelectric conversion element are discharged via the reset switch. The above-mentioned operation corresponds to the resetting operation. With respect to an accumulation time period conducted in the first embodiment, an accumulation starting time is determined by the resetting operation, and an accumulation end time is determined by the reading out operation.

Figure 4A:
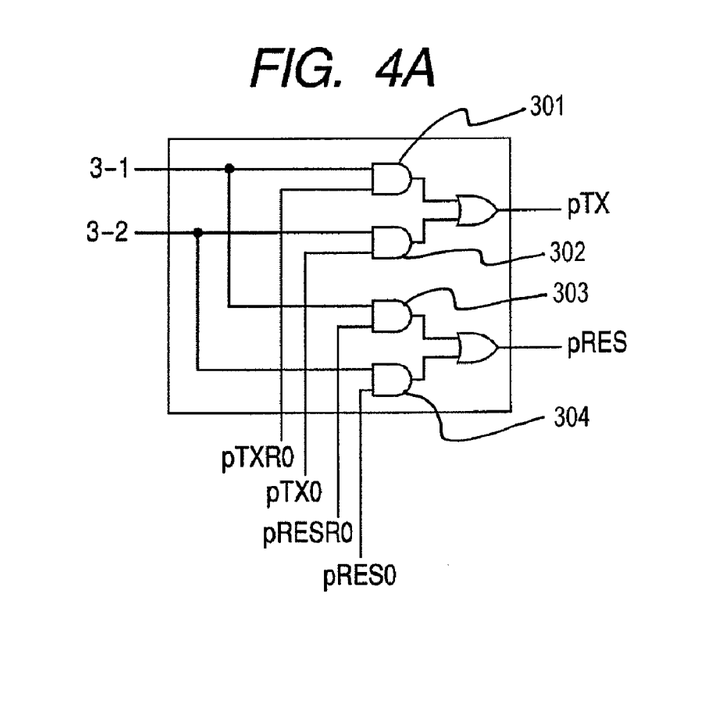
FIG. 4A is a structural diagram of a logic circuit provided in the first embodiment.
Figure 4B:
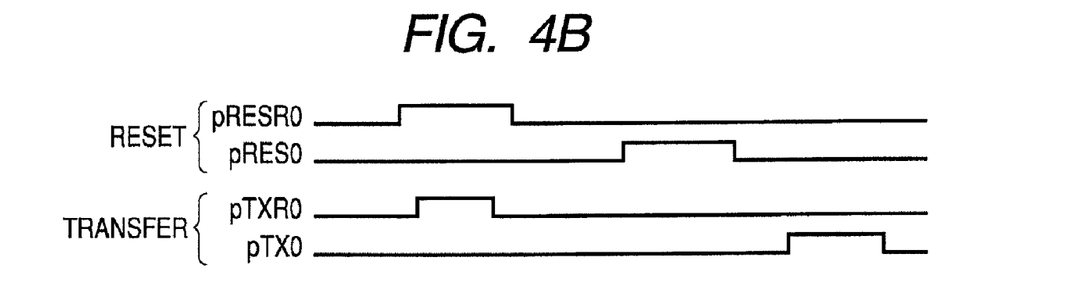
FIG. 4B illustrates a pulse diagram of the logic circuit illustrated in FIG. 4A.

FIG. 4A illustrates one example as to a concrete structure of the logic circuit 1-4, and FIG. 4B represents waveforms of pulses which are supplied to the logic circuit 1-4. The structural example illustrated in FIG. 4A is a portion corresponding to one pixel row of a pixel array arranged in matrix.

In FIG. 4A, the logic circuit includes an input portion 3-1 to which the output of the reset decoder 1-6 is supplied, and another input portion 3-2 to which the output of the read-out decoder 1-5 is supplied. The above-mentioned logic circuit further includes a first AND circuit 301 and a third AND circuit 303, in which the output of the reset decoder 1-6 is supplied to one input portion thereof; and still further includes a second AND circuit 302 and a fourth AND circuit 304, in which the output of the read-out decoder 1-5 is supplied to one input portion thereof. A pulse pTXR0 is supplied to the other input portion of the first AND circuit 301, whereas another pulse pTX0 is supplied to the other input portion of the second AND circuit 302. Also, a pulse pRESR0 is supplied to the other input portion of the third AND circuit 303, whereas another pulse pRES0 is supplied to the other input portion of the fourth AND circuit 304.

FIG. 4B represents an example of a pulse waveform diagram for indicating the pulses pTX0, pTXR0, pRES0, and pRESR0. The above-mentioned pulses pTX0 and pTXR0 correspond to read-out pulses, namely the pulses used to generate the pulse pTX. Then, the above-mentioned pulses pRES0 and pRESR0 correspond to reset pulses, namely the pulses used to generate the pulse pRES. In such a case where the signal level of the output from the reset decoder 1-6 is High, and the signal level of the output from the read-out decoder 1-5 is Low, the above-mentioned resetting operation is carried out with respect to the above-mentioned pixel row. In such a case where the signal level of the output from the reset decoder 1-6 is Low, and the signal level of the output from the read-out decoder 1-5 is High, the above-mentioned reading out operation is carried out with respect to the above-mentioned pixel row.

The output pulse pTX from the logic circuit 1-4 is supplied to a gate of the transfer switch 2-2, and the output pulse pRES is supplied to a gate of the reset switch 2-3. As a result, both the transfer pulse pTX and the reset pulse pRES can be supplied only to such a row which is selected by the reset decoders 1-6a, 1-6b, and the read-out decoder 1-5.

The pulse pTX0 is supplied as the transfer pulse pTX which is supplied to the pixel row selected by the read-out decoder 1-5, and the pulse pRES0 is supplied as the reset pulse pRES to be supplied to the selected pixel row. The pulse pTXR0 is supplied as the transfer pulse pTX which is supplied to the pixel row selected by the reset decoders 1-6a and 1-6b, and the pulse pRESR0 is supplied as the reset pulse pRES to be supplied to the selected pixel row.

Figure 5:
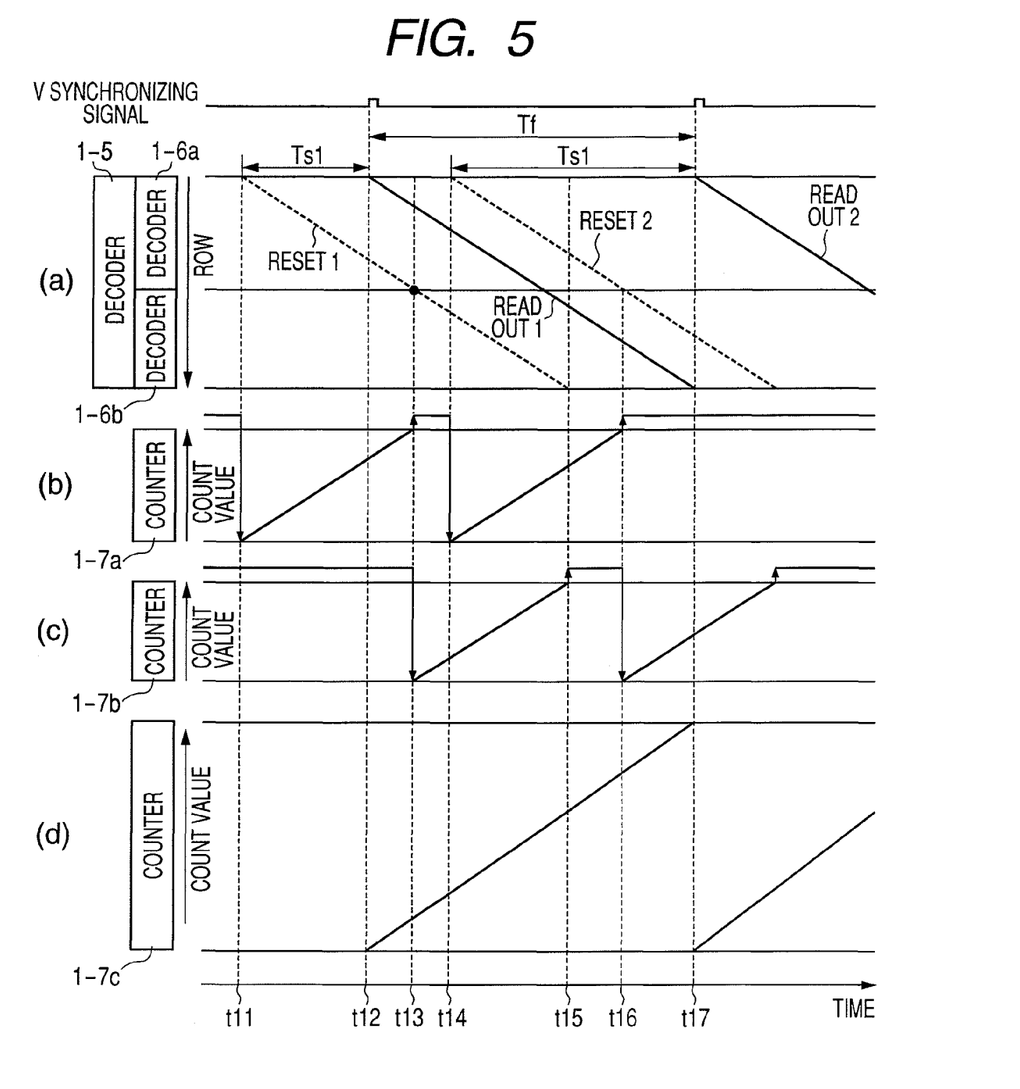

(a) to (d) of FIG. 5 illustrate transitions as to resetting timing, reading timing, and count values of the counter 1-7 in such a case where all of the pixel rows are read out. (a) of FIG. 5 represents a vertical synchronizing signal (V synchronizing signal), and timing when the decoder accesses the respective pixel rows in such a case where the accumulation time period is switched from Ts1 to Ts2 longer than Ts1 in continuous image frames, since the shutter time is switched.

(b) of FIG. 5 illustrates a transition of count values of the counter 1-7a which corresponds to the decoder 1-6a in the above-mentioned timing. (c) of FIG. 5 indicates a transition of count values of the counter 1-7b which corresponds to the decoder 1-6b. (d) of FIG. 5 illustrates a transition of count values of the counter 1-7c which corresponds to the decoder 1-5.

In (a) to (d) of FIG. 5, at a time t12, a reading out operation for a predetermined image frame (first frame) is started, and at a time t17, a reading out operation for a next image frame (second frame) is started. An accumulation time period of the first frame is Ts1, and an accumulation time period of the second frame is Ts2. Since the reading out operation of the first frame is started at the time t12, a resetting operation is started from a time t11 which precedes the time period Ts1 from the time t12. In the second frame, a resetting operation is started at a time t14 which precedes the time period Ts2 from the reading out operation time t17.

Since the accumulation time period Ts2 is longer than the accumulation time period Ts1, two pixel rows different from each other are required to be reset at the same time during a time duration defined from a time t15 up to a time t16. As previously described, the reset decoders are arranged in such a manner that the decoder 1-6a and the decoder 1-6b can simultaneously scan both the pixel row of the first pixel region 1-1a, and the pixel row of the second pixel region 1-1b which is different from the first pixel region 1-1a. In other words, the decoders 1-6a and 1-6b are constructed in such a manner that the decoders 1-6a and 1-6b perform the resetting operations with respect to the pixel rows which are arranged in the respective pixel regions different from each other. As a consequence, the resetting operations for two pixel rows can be carried out at the same time by those decoders 1-6a and 1-6b. It is arranged that both the decoders 1-6a and 1-6b cannot perform the resetting operations with respect to the same region within the pixel region. If such an arrangement is employed, then the circuit scales of those decoders are increased, and the occupation areas of those decoders on the semiconductor substrate are increased. According to the first embodiment, occupation areas of the decoders 1-6a and 1-6b can be made substantially half, as compared with those of such an arrangement that both the decoders can perform the resetting operations with respect to the same region.

Moreover, according to the arrangement of the first embodiment, such a time (time t16 in first embodiment) when the resetting operations of the second frames are finished until a half of the entire pixel row may be alternatively prolonged up to the time t15 illustrated in (d) of FIG. 5.

A specific description is made of operations of the counters 1-7a and 1-7b, and of the decoders 1-6a and 1-6b employed in the first embodiment.

If the counter 1-7a starts a count-up operation at the time t11 and the count-up operation reaches the time t13 at which the resetting operation for the first frame by the decoder 1-6a reaches the ½ region of the entire pixel region, the counter 1-7a outputs a maximum count value. Subsequently, the counter 1-7a maintains the maximum count value until the time t14 at which the resetting operation for the second frame by the decoder 1-6a is started. When the count-up operation of the counter 1-7a reaches the time t14, this counter 1-7a again starts a count-up operating from zero.

Also, the counter 1-7b starts a count-up operation at the time t13 at which the resetting operation for the first frame by the decoder 1-6b reaches the ½ region of the entire pixel region, and then the counter 1-7b outputs a maximum count value at the time t15 at which the resetting operation for the first frame reaches a last row. Thereafter, the counter 1-7b maintains the maximum count value until the time t16 at which the resetting operation for the second frame by the decoder 1-6b reaches the ½ region of the entire pixel region. From the time t16, the counter 1-7b starts a count-up operation in conjunction with the resetting operation of the second frame.

The first embodiment has exemplified such a case where a frame rate Tf is equal to a time required for executing one of reading out operations and resetting operations as to all of the pixel rows, namely, is equal to (total number of the entire pixel rows)×Th. In this formula, symbol Th indicates a time required for executing the operation for 1 pixel row, namely, a time of 1 horizontal time period. In this case, the time period Ts2 may be set longer than the time period Ts1 by Tf/2 at maximum.

Also, when a time required for performing one of the reading out operations and the resetting operations as to all of the pixel rows is shorter than the frame rate Tf, namely when (total row number)×Th becomes shorter than the frame rate Tf, the time period Ts2 may be alternatively set to be longer than the time period Ts1 by Tf/2+(Tf−(all rows)×Th) at maximum. Further, in the first embodiment, the pixel region has been divided by ½, and the reset decoders have been divided with respect to the respective divided pixel regions. Alternatively, a dividing number, and also, a number of such pixel rows which are allocated to sub-divided decoders may be arbitrarily set.

Second Embodiment

In a second embodiment of the present invention, a description is made of an example in which both a row where a reading out operation is started and an accumulation time period for electric charges in a photoelectric conversion element are switched in two frames. Electronic zooming can be carried out by changing the row where the reading out operation is started.

Figure 6:
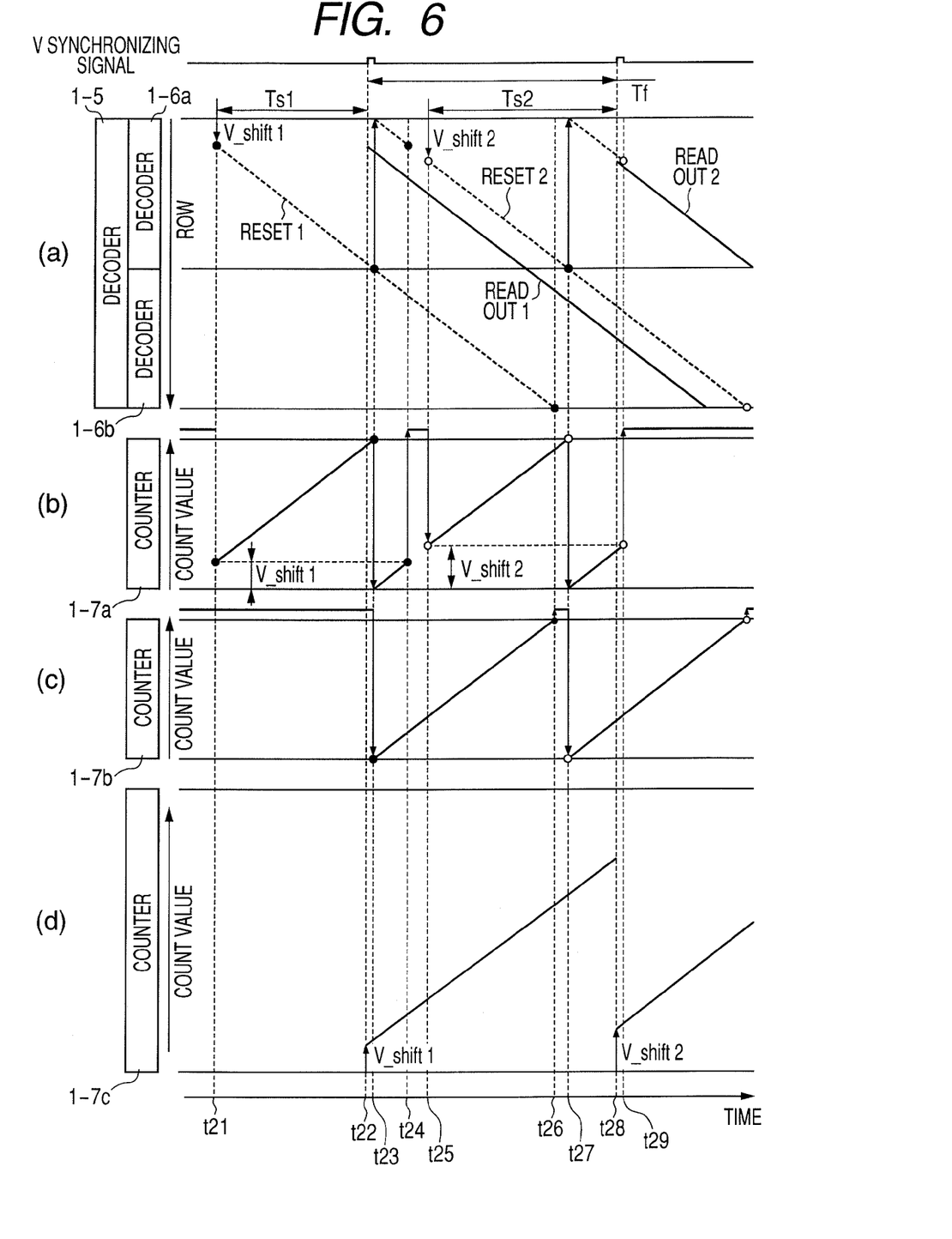
Figure 7:
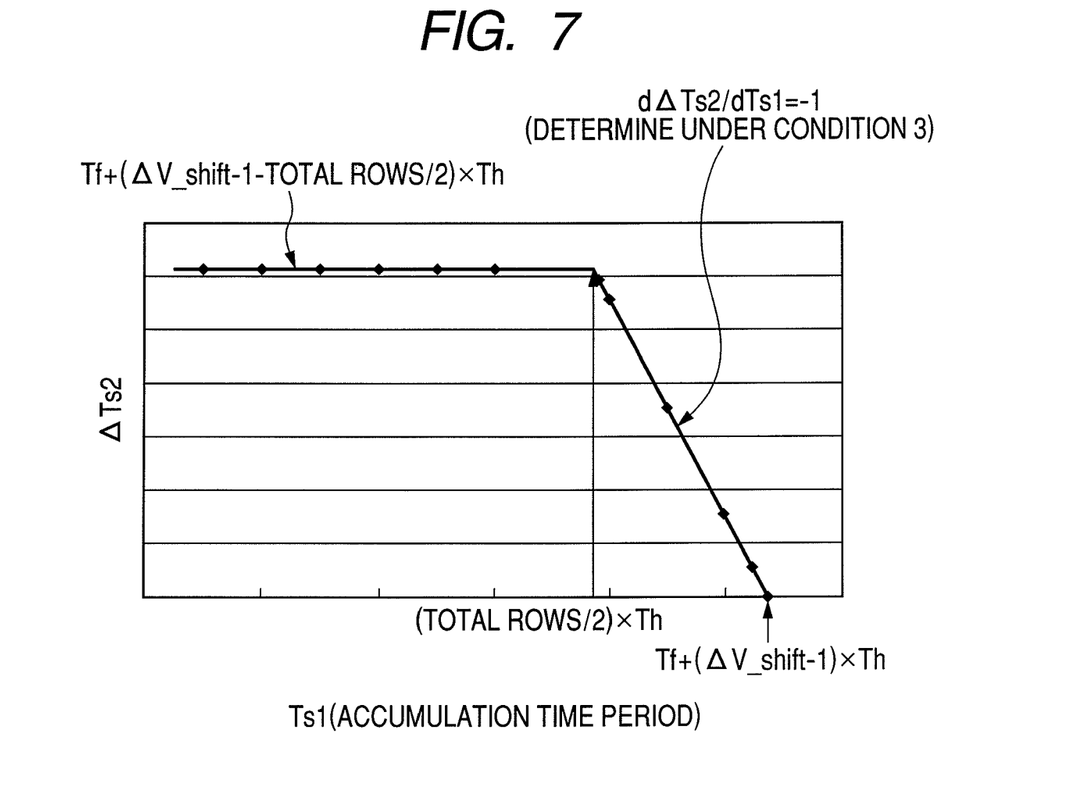
FIG. 7 is a diagram for describing a relationship change amounts between an accumulation time period of an n frame, and an accumulation time period of a frame subsequent to the n frame in the solid-state imaging apparatus of the second embodiment.

(a) to (d) of FIG. 6 illustrate timing diagrams of the second embodiment, which are described referring to those of (a) to (d) of FIG. 5. In the second embodiment, an entire circuit and a structure of a unit pixel similar to those of the first embodiment can be employed.

(a) of FIG. 6 illustrates a vertical synchronizing signal (V synchronizing signal), and timing when decoders access respective pixel rows in a case where shutter time is switched, whereby an accumulation time period is switched from Ts1 to Ts2 longer than Ts1 in continuous image frames. In addition, positions of pixel rows in which scanning operations are started are different from each other in both image frames.

(b) of FIG. 6 illustrates a transition of count values of the counter 1-7a which corresponds to the decoder 1-6a at the above-mentioned timing. (c) of FIG. 6 illustrates a transition of count values of the counter 1-7b which corresponds to the decoder 1-6b. (d) of FIG. 6 illustrates a transition of count values of the counter 1-7c which corresponds to the decoder 1-5.

RESET 1 represents a resetting operation of a first frame, READ 1 represents a reading out operation of the first frame, RESET 2 represents a resetting operation of a second frame, and READ 2 represents a reading out operation of the second frame.

In the first frame, it is assumed that the reading out operation is started from a V_shift1st row, and an accumulation time period is Ts1. In the second frame, it is assumed that the reading out operation is started from a V_shift2nd row, and an accumulation time period is Ts2 which is longer than Ts1. It is assumed that a time period required for scanning one pixel row, namely, a time period of one horizontal time period is Th.

At a time t22, the V synchronizing signal is supplied to the timing generating circuit TG1-8, and a scanning operation by the decoder 1-5 is started. A scanning start position of the decoder 1-5 is started from the same pixel row as a scanning start position of the reset decoder 1-6 which has already been started from one preceding frame with respect to the first frame. This scanning start position may be arbitrarily determined, and can be determined by setting an arbitrary value V_shift to an initial value of a counter in this case. The decoder 1-6a performs a resetting operation for a pixel row of a first pixel region, and the decoder 1-6b performs a resetting operation for another pixel row of a second pixel region which is different from the first pixel region. In this case, the first pixel region and the second pixel region do not have regions which are overlapped with each other, and form the entire pixel region.

In a resetting operation of the first frame, a scanning operation is started at a time t21 which precedes the time t22 by the time period Ts1. In this resetting operation, the scanning operation is started from the V_shift1st row. When the counter 1-7a performs a counting operation until a time t23, the counter 1-7b starts a counting operation, which corresponds to the decoder 1-6b for scanning a pixel row of the second pixel region in conjunction with the counting operation of the counter 1-7a. After the counter 1-7b starts the counting operation, the counter 1-7b continues the counting operation until a last row of the pixel region is selected. After selecting operations for all pixel rows is finished, the counter 1-7b continuously outputs a value which is larger than the maximum number of the decoder 1-6b until a starting signal in conjunction with the counter 1-7a is supplied. At the time t23, the decoder 1-6a finishes the resetting operations for (all pixel rows/2)−V_shift1 rows. In other words, among the resetting operations of the first frame, the scanning operation of the pixel row where the resetting operation of the first pixel region should be carried out is finished. Then, the counter 1-7a resets the count value in order to perform resetting operations from the first row which has not been selected until the time t23 up to a (V_shift1)−1 row, and then, performs a counting operation up to the (V_shift1)−1 row. After the counter 1-7a performs the counting operations until the (V_shift1)−1 row, similar to the counter 1-7b, the counter 1-7a continuously outputs a value which is larger than a maximum number of the decoder 1-6a until a next count starting signal is supplied. In other words, when a reading out region and a non-reading out region are set in the manner similar to an electronic zooming operation or the like, a counter corresponding to a first decoder is set to an initial value corresponding to a head pixel row of the reading out region. Then, after a resetting operation for the reading out region is finished, a resetting operation for the non-reading out region located within the first pixel region is carried out.

Through an operation described above, all of the pixel rows can be reset at least one time within one frame. In this case, at an end position of the reading out operation, if a count value of the counter 1-7c reaches V_shift1+reading row number, the counter 1-7c continuously outputs a value larger than the maximum number of the decoder 1-5 until a next V synchronizing signal is supplied in a similar manner to other counters. In the second embodiment, because the V synchronizing signal is supplied just after the reading out operation of the first frame is finished, the counting operation is entered to a reading out operation of a second frame without outputting a value larger than the maximum number. V_shift and a reading row number may be set to arbitrary values, and hence the reading position can be controlled in the unit of a single pixel.

In the second embodiment, imaging conditions such as an accumulation time period, a reading start row, and a reading end row are set when instruction signals issued from a microcomputer (not illustrated) are supplied to the timing generating circuit TG1-8. In this case, a sequential operation when the microcomputer determines the imaging conditions will be describe as follows:

Condition 1: A time t24 precedes a time t25:

$$t24<t25 \quad (1)$$

$$t24=t22+(Tf-Ts2) \quad (2)$$

$$t25=t22+(\text{all pixel rows}/2) \times Th-Ts1 \quad (3)$$

Condition 2: A time t26 precedes a time t27:

$$t26<t27 \quad (4)$$

$$t26=t25+\{(\text{all pixel rows}/2)-V\_shift2\} \times Th \quad (5)$$

$$t27=t22+(\text{all pixel rows}-V\_shift1) \times Th-Ts1 \quad (6)$$

Condition 3:

$$V\_shift \times Th < Th-Ts2 \quad (7)$$

$$Ts2 < Tf-V\_shift \times Th \quad (8)$$

The condition 1 implies a condition in which two pixel rows of a pixel region scanned by the decoder 1-6a at the same time are prevented from being simultaneously selected. In other words, the condition 1 prohibits that the decoder 1-6a performs the resetting operations with respect to the different pixel rows at the same time in the first pixel region.

The condition 2 implies a condition in which the condition 1 is applied to the decoder 1-6b. In other words, the condition 2 prohibits that the decoder 1-6b performs the resetting operations with respect to the different pixel rows at the same time in the second pixel region.

The condition 3 implies a condition in which the timing of the resetting operation for the second frame does not precede the reading out operation of the first frame in a temporal manner in FIG. 6A to FIG. 6D.

If the condition 1 is modified, the following formula may be established:

$$Ts2-Ts1<Tf-(\text{all pixel rows}/2) \times Th \quad (9)$$

The condition 2 may be modified as follows:

$$Ts2-Ts1<\{\Delta V\_shift-(\text{all pixel rows}/2)\} \times Th+Tf \quad (10)$$

ΔV_shift is defined as:

$$\Delta V\_shift=V\_shift2-V\_shift1 \quad (11)$$

Assuming that a reading start position in a certain frame is V_shift2, ΔV_shift is equal to a difference between V_shift2 and V_shift1 which corresponds to a reading start position immediately preceding frame thereof.

(a) to (d) of FIG. 6 illustrate a relationship between Ts1 and Ts2-Ts1 in a case where a maximum Δ V_shift and a minimum ΔV_shift are set to fixed values. According to the second embodiment, in a case where the maximum ΔV_shift and the minimum ΔV_shift are set to the fixed values, a maximum ΔTs2 (change amount of Ts2) which can be changed until Ts1 becomes (all pixel rows/2)×Th may be given as a constant value defined as:

$$Tf+\{\Delta V\_shift-1-(\text{all pixel rows}/2)\} \times Th.$$

This is determined by the condition 2. Then, the maximum changeable ΔTs2 is decreased at an inclination of −1.

In a case where an imaging operation is carried out at a constant frame rate, if Ts1 becomes Tf+(ΔV_shift−1)×Th, an accumulation time period cannot be prolonged. In order to prolong the accumulation time period further, the frame rate is lowered and Tf is prolonged.

In the second embodiment, the instruction signals are supplied from the microcomputer to the timing generating circuit TG within a range satisfying the above-mentioned three conditions, and hence both the accumulation time period and the reading start position can be arbitrarily set for every frame. As a result, the sensor can be driven in response to a change in brightness when a moving picture is photographed. Moreover, the sensor can be driven with respect to electronic vibration isolation. Further, because the scanning circuits are formed not by shift registers, but by the decoders, the scanning circuits can be easily driven in various modes such as an addition mode, an interlace mode, a progressive mode, and a thinning-out mode.

From another viewpoint, in the second embodiment, all of the pixels can be surely selected one time for every frame by the reset decoders, and hence the charges of the photoelectric conversion elements other than the reading out region can also be reset. As a result, the blooming effect from the photoelectric conversion elements other than the reading out region can be suppressed, and hence images having high image qualities can be photographed.

In the second embodiment, the reset decoders are divided so that the pixel region is divided into two (namely, first pixel region and second pixel region). Alternatively, a total number of sub-divisions, and a total number of pixel rows which are allocated to one decoder may be arbitrarily set. As described in the first embodiment, it is not necessarily required that the pixel region is clearly divided.

Further, in a case where a dividing number of the decoders and scanning patterns are changed, driving conditions given under the dividing number and the vertical scanning pattern may be newly set by the above-mentioned microcomputer.

Third Embodiment

In a third embodiment of the present invention, a description is made of a case where a pixel region is divided into two pixel regions, decoders are provided in correspondence with those two divided pixel regions, and further, another decoder (third decoder) is provided so as to scan an optical black (OB) row. As in the case of the second embodiment, a pixel row in which a reading out operation is started and an accumulation time period are switched between two continuous frames. The structures and the operations described in the first and second embodiments except for an operation related to the optical black region may be applied to structures and operations of the third embodiment.

Figure 8:
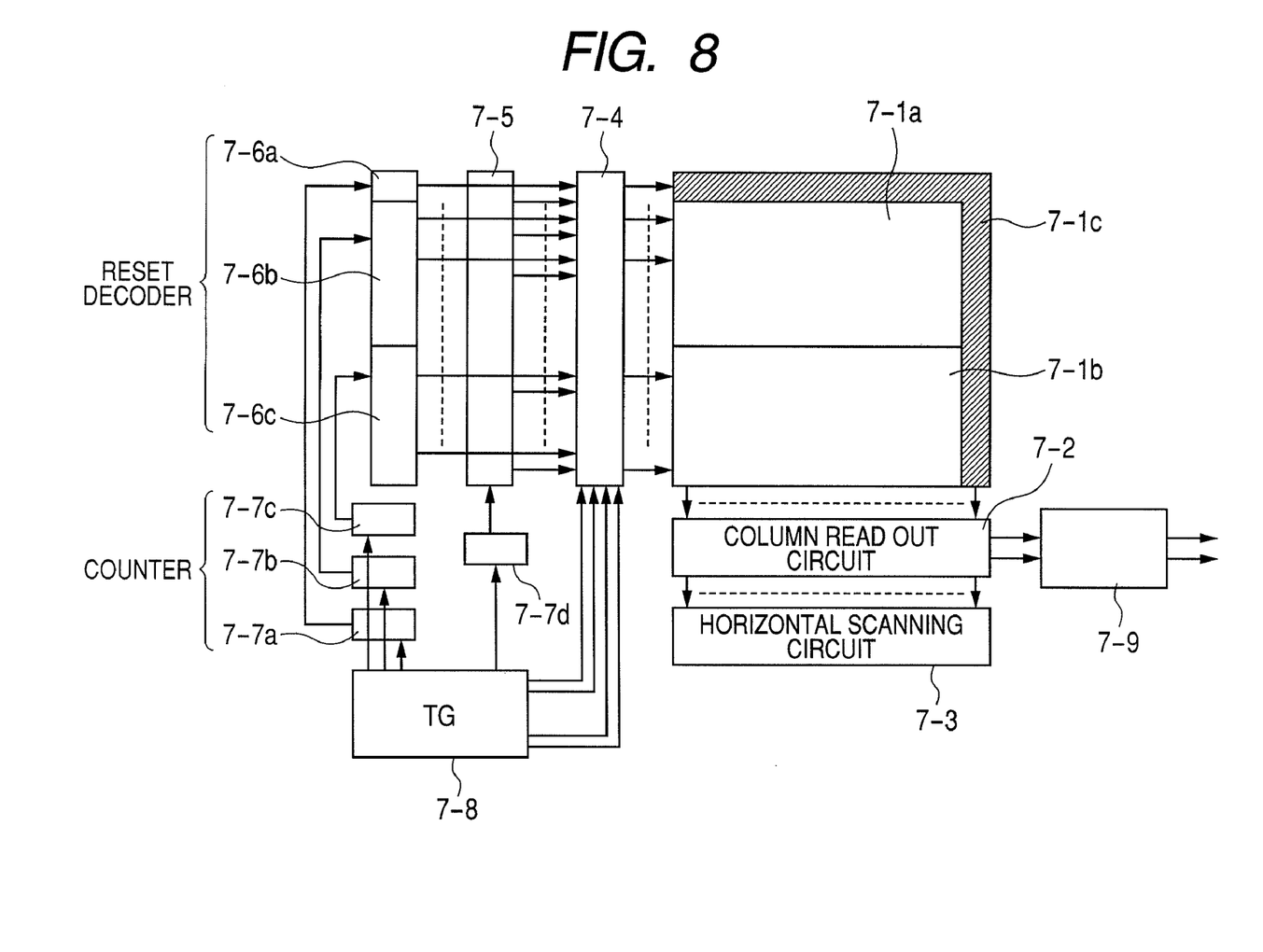
FIG. 8 schematically illustrates an entire structure of a solid-state imaging apparatus according to a third embodiment of the present invention.

FIG. 8 illustrates an entire structure of the solid-state imaging apparatus according to the third embodiment. Reference numerals 7-1a and 7-1b denote effective pixel regions in which a plurality of unit pixels illustrated in FIG. 2 are arranged in array. Reference numeral 7-1c denotes an OB region. A read-out circuit 7-2 reads out signals from the pixel regions. A horizontal scanning circuit 7-3 sequentially reads out signals which have been subjected to a predetermined processing by the read-out circuit 7-2. An output amplifier 7-9 amplifies signals which have been sequentially read out. Reference numeral 7-6a denotes a reset decoder (namely, third decoder) provided for the OB region. Reference numerals 7-6b and 7-6c denote reset decoders provided for the effective pixel regions 7-1a and 7-1b. The decoders 7-6a, 7-6b, and 7-6c have counters 7-7a, 7-7b, and 7-7c, respectively. Reference numeral 7-5 denotes a reading decoder which is controlled by the counter 7-7d. In the third embodiment, the counters 7-6b and 7-6c perform scanning operations for (effective pixel rows/2) rows, respectively. It should be noted that this pixel row number may be arbitrarily set.

Reference numeral 7-4 denotes a logic circuit to which the decoders 7-6a to 7-6c outputs, and a control pulse from a timing generator (TG) 7-8 is input. Since a specific circuit for 1 row of the logic circuit 7-4, and the control pulse may be realized by employing those similar to the first and second embodiments, a description thereof will be omitted.

Figure 9:
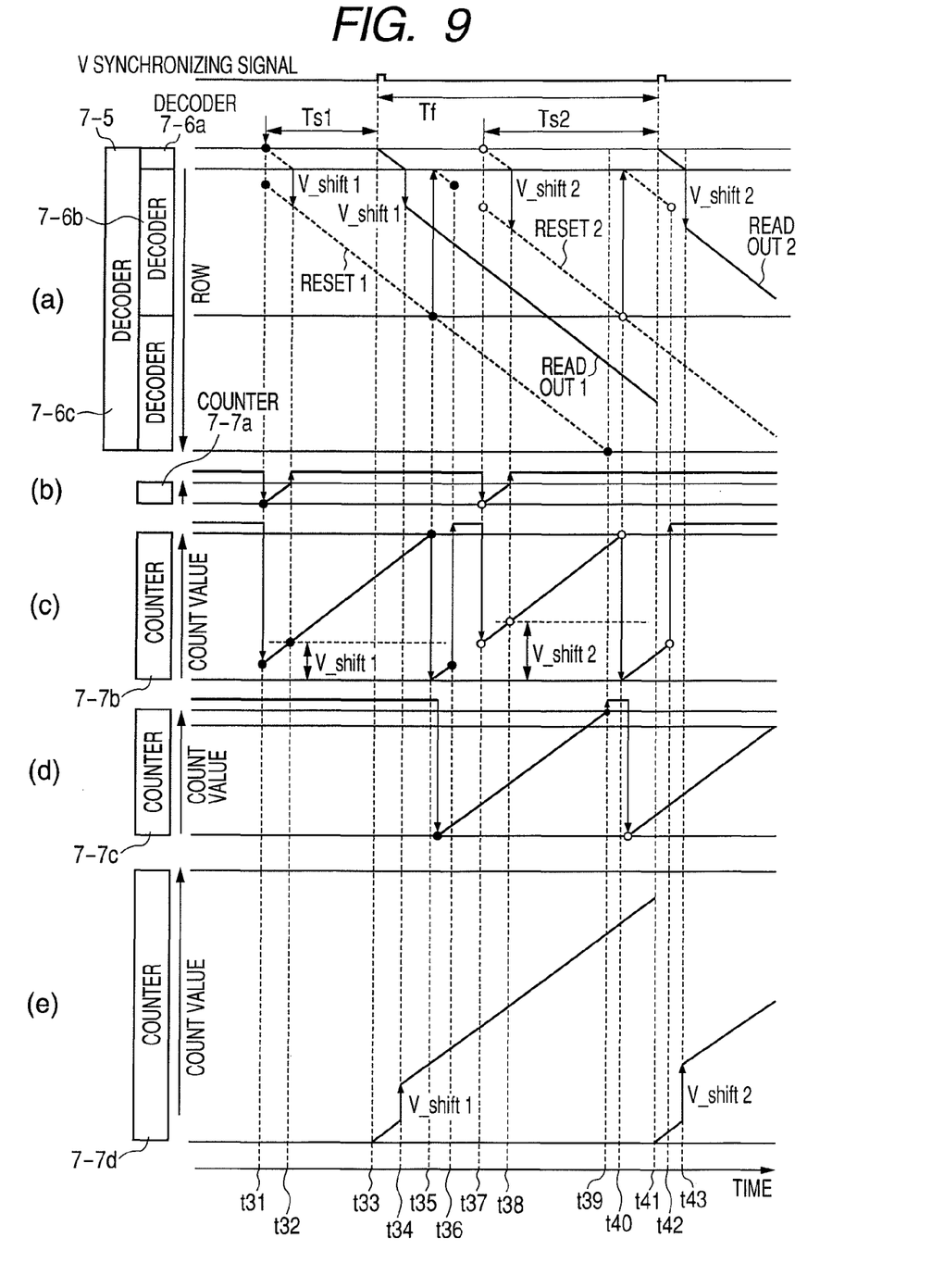

(a) to (e) of FIG. 9 illustrate timing charts in the third embodiment, which are described referring to (a) to (d) of FIG. 5, and (a) to (d) of FIG. 6. (a) of FIG. 9 illustrates a vertical synchronizing signal (V synchronizing signal) and timing when the decoders 7-6a to 7-6c, and 7-5 access respective pixel rows in a case where shutter time is switched, and an accumulation time period is switched from a time period Ts1 to another time period Ts2 which is longer than the time period Ts1 in continuous image frames. In addition, positions of pixel rows where scanning operations are started are different from each other in both the image frames.

(b) of FIG. 9 illustrates a transition of count values of the counter 7-7a which corresponds to the decoder 7-6a at the above-mentioned timing. (c) of FIG. 9 illustrates a transition of count values of the counter 7-7b which corresponds to the decoder 7-6b. (d) of FIG. 9 illustrates a transition of count values of the counter 7-7c which corresponds to the decoder 7-6c. (e) of FIG. 9 illustrates a transition of count values of the counter 7-7d which corresponds to the decoder 7-5.

RESET 1 represents a resetting operation of a first frame, READ 1 represents a reading out operation of the first frame, RESET 2 represents a resetting operation of a second frame, and READ 2 represents a reading out operation of the second frame.

It is assumed that in the first frame, after the OB region 7-1c is scanned, a reading out operation is started from a V_shift1st row of the effective pixel region 7-1a, and an accumulation time period is Ts1. Besides, it is assumed that in the second frame, a reading out operation is started from a V_shift2nd row of the effective pixel region 7-1a, and an accumulation time period is Ts2 which is longer than the accumulation time period Ts1. A time period required for scanning one pixel row, namely, a time period required for one horizontal scanning period is assumed as Th.

A resetting operation for the first frame is started at a time t31. At the same time, a resetting operation is started also in the OB region 7-1c. When the counter 7-7a starts a counting operation from a time t33, the counter 7-7b also starts a counting operation at the same time. In this case, the decoder 7-6b may be driven in correspondence with values continuous from the counter 7-7a. Before the counter 7-7a finishes the counting operation, namely, while the resetting operation of the counter 7-7a for the OB region 7-1c is being carried out, the decoder 7-6b starts a decoding operation from a preceding row with respect to a pixel row where the resetting operation should be performed by a row number for carrying out the resetting operation of the OB region 7-1d. When the counting operation of the counter 7-7a is finished, the counter 7-7a starts a resetting operation for a pixel row where the resetting operation should be started, namely for the V_shift 1 row.

The V_shift1 row is equivalent to a reading start position of the effective pixel region 7-1a for the first frame. In this case, the counter 7-7a continuously outputs a value which is larger than a maximum number of the decoder 7-6a until the counter 7-7a starts a next resetting operation. When the counter 7-7b performs a counting operation up to a time t35, the counter 7-7c corresponding to the decoder 7-6c which scans a pixel row of the second pixel region starts a counting operation thereof in conjunction with the counting operation by the counter 7-7b. In this case, the time t35 may be expressed as follows:

$$t35=t33+\{(\text{effective pixel number}/2)-V\_shift1\} \times Th \quad (12)$$

After the counter 7-7c has started a counting operation, the counter 7-7c continuously performs the counting operation until the designated last pixel row of the effective pixel region is selected. After the counting operations for all of the pixel rows have been finished, the counter 7-7c continuously outputs a count value which is larger than the maximum number of the decoder 7-6c until a start signal produced in conjunction with the counter 7-7b is subsequently supplied.

At a time t35, the resetting operation for (effective pixel row number/2)+(total row number of OB region)−V_shift1) rows is finished. Then, the counter 7-7b performs such a resetting operation as to (V_shift1)−1−(total row number of OB region) rows which have not been selected until the time t35. As a result, the counter 7-7b resets the count value, and executes a counting operation up to the (V_shift1)−1−(total row number of OB region) rows. After the counter 7-7b has performed the counting operation up to the (V_shift1)−1−(total row number of OB region) rows, this counter 7-7b continuously outputs a count value which is larger than the maximum number of the decoder 7-6b in a similar manner to the counters 7-7a and 7-7c until a next count starting signal is supplied. As a result, all of the pixel rows can be reset at least one time within 1 frame. In this example, if a count value of the counter 7-7d has reached V_shift+(reading row number), the counter 7-7d continuously outputs such a value larger than the maximum number of the decoder 7-5 until a next V synchronizing signal is supplied in a similar manner to other counters. Both V_shift and a reading row number may be set to be arbitrary values, and hence the reading position can be controlled in a single pixel unit.

In the second embodiment, imaging conditions such as an accumulation time period, a reading start row, and a reading end row are set when instruction signals issued from a microcomputer (not illustrated) are supplied to the timing generating circuit TG7-8. In this case, a sequential operation when the microcomputer determines the imaging conditions will be describe as follows:

Condition 1: A time t36 precedes a time t37:

$$t36<t37 \quad (13)$$

$$t36=t33+(Tf-Ts2) \quad (14)$$

$$t37=t33+(\text{effective pixel number}/2) \times Th-Ts1 \quad (15)$$

Condition 2: A time t39 precedes a time t40:

$$t39<t40 \quad (16)$$

$$t39=t37+\{(\text{effective pixel number}/2)+\text{vertical OB row number}-V\_shift2\} \times Th \quad (17)$$

$$t40=t22+(\text{effective pixel number}+\text{vertical OB row number}-V\_shift1)\times Th-Ts1 \quad (18)$$

$$\text{Condition 3: } V\_shift\times Th<Th-Ts2 \quad (19)$$

If the formula (19) is modified, the following formula is established.

$$Ts2<Tf-V\_shift\times Th \quad (20)$$

The condition 1 corresponds to such a condition for avoiding that in the decoder 7-6*b*, two pixel rows are simultaneously selected at the same time. The condition 2 corresponds to such a condition for avoiding that in the decoder 7-6*c*, two pixel rows are simultaneously selected at the same time. The condition 3 implies a condition in which the timing of the resetting operation for the second frame does not precede the timing of the reading out operation for the first frame in a temporal manner.

Moreover, when the condition 1 is modified, it becomes:

$$Ts2-Ts1<Tf-(\text{effective pixel row number}/2)\times Th \quad (21)$$

The second condition 2 becomes:

$$Ts2-Ts1<\{\Delta V\_shift-(\text{effective pixel row number}/2)\}\times Th+Tf \quad (22)$$

Assuming that Ts2 is an accumulation time period of a certain frame, symbol ΔTs2 is a change amount of the accumulation time period from the accumulation time period Ts1 immediately preceding frame thereof. Also, symbol ΔV_shift corresponds to ΔV_shift=V_shift2−V_shift1 - - - (23). Assuming that a reading start position in a certain frame is V_shift2, ΔV_shift becomes a difference between V_shift2 and V_shift1 which corresponds to a reading start position immediately preceding frame thereof.

Figure 10:
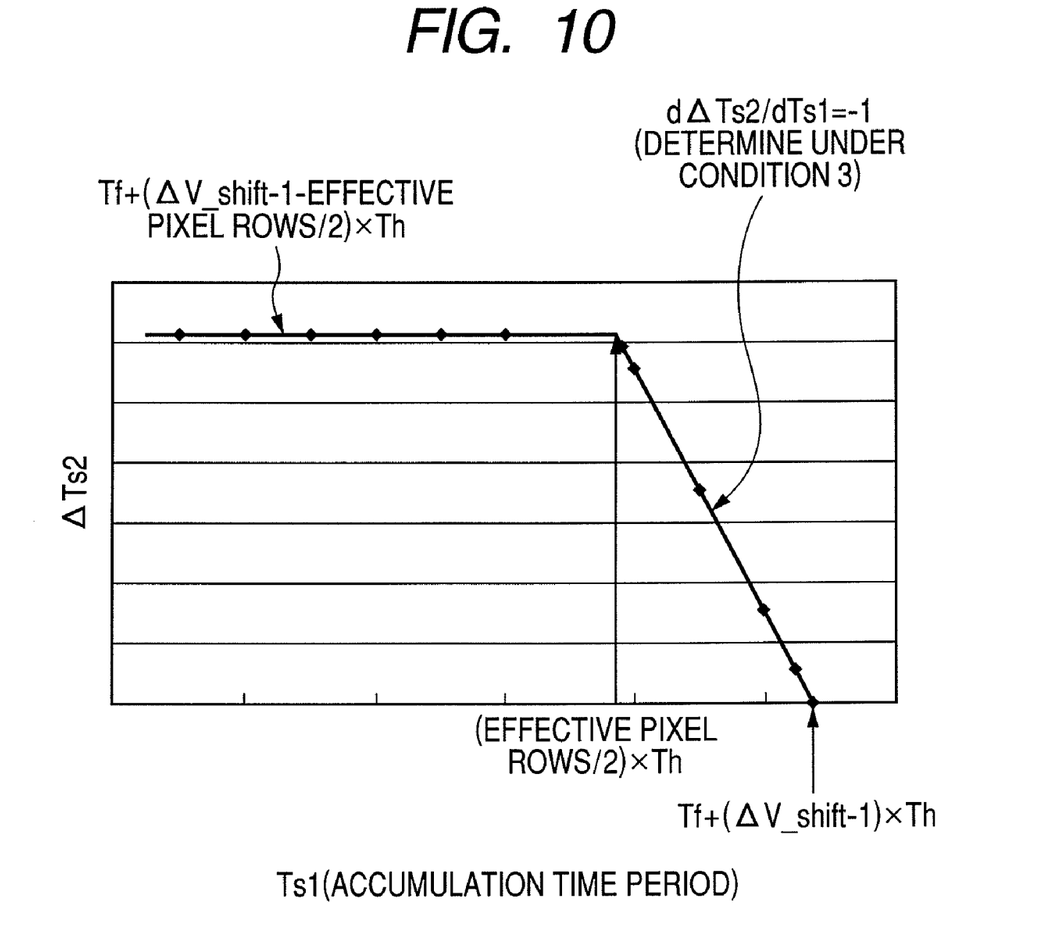
FIG. 10 is a diagram for describing a change in accumulation time period in the third embodiment.

FIG. 10 indicates a relationship between Ts2−Ts1 and Ts1 in a case where the maximum and minimum ΔV_shift are set to fixed values.

Until Ts1 becomes (effective pixel row number/2)×Th, the maximum changeable Ts2−Ts1 becomes such a constant as Tf+{ΔV_shift−1−(effective pixel row number/2)}×Th. This is determined by the condition 2. Then, the maximum changeable ΔTs2 is decreased at an inclination of −1. In such a case where an imaging operation is carried out in a constant frame rate, if the time period Ts1 becomes Ts1=Tf+(ΔV_shift−1)×Th - - - (24), an accumulation time period cannot be prolonged. In order to prolong the accumulation time period further, the frame rate is lowered and Tf is prolonged.

Both the accumulation time and the reading start position can be arbitrarily set within such a range capable of satisfying the above-mentioned three conditions. As a result, the sensor can be driven in response to a change in brightness when a moving picture is captured. Moreover, the sensor can be driven with respect to electronic vibration isolation. Further, because the scanning circuits are formed not by shift registers, but by the decoders, the vertical scanning circuits can be easily driven in various modes such as an addition mode, an interlace mode, a progressive mode, and a thinning-out mode.

In a case where ΔV_shift is a positive value, namely, a reading out region is moved to a lower direction of a screen, as compared with that of a preceding frame, in a row preceding the reading out region for ΔV_shift, an accumulation time period becomes longer than that of the pixel of the reading out region. When light having high intensity has been entered, there is such a risk that electric charges may be leaked from the pixel whose accumulation time period is long into the pixel of the reading out region. However, as described in the third embodiment, in a case where the scanning operation of the reset decoder has started prior to such a total row number where the OB region should be activated, the accumulation time period for the total row number of the OB region which is located adjacent to the effective pixel region can be made equal to the accumulation time period for the reading out region. As a result, it is possible to suppress that the electric charges are leaked from the pixels which have been reset prior to the total row number of the OB region into the pixel of the effective pixel region. In addition, excessive charges generated in pixels located outside the above-mentioned pixels are leaked into the previously reset pixels, and hence an adverse influence on the reading pixel region can be suppressed.

In the third embodiment, one reset decoder is set with respect to the OB region, and two reset decoders are set with respect to the effective pixel region, namely, three reset decoders are set in total. Alternatively, a dividing number, and a total row number allocated to one decoder may be arbitrary selected. Further, in a case where a dividing number of the decoders and vertical scanning patterns are changed, restrictions of driving conditions given under the dividing number and the vertical scanning pattern may be newly set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-294438, filed Nov. 13, 2007, which is hereby incorporated by reference herein in its entirety.

What is claimed is:

1. A solid-state imaging apparatus comprising:
   a pixel region including a plurality of pixels arranged in a matrix, the pixel region including first and second pixel regions, each pixel including:
   a photoelectric conversion element,
   a reset switch for discharging an electric charge of the photoelectric conversion element,
   an amplifier unit for amplifying a signal based on the electric charge of the photoelectric conversion element, and
   a transfer switch for transferring to an input portion of the amplifier unit;
   a first scanning circuit for supplying a reset control signal for controlling an operation of the reset switches, wherein the pixel region and the first scanning circuit are disposed on a semiconductor substrate, and wherein the first scanning circuit includes a first decoder for controlling an operation of a reset switch in the first pixel region, and a second decoder for controlling an operation of a reset switch arranged in the second pixel region;
   a second scanning circuit for supplying a transfer control signal for controlling an operation of the transfer switches, wherein the second scanning circuit includes a third decoder for generating the transfer control signal; and
   a logic circuit for supplying one or more pixel rows with the reset control signal and the transfer control signal, respectively, responsive to a pulse from the first or the second decoder and to a pulse from the third decoder.

2. The solid-state imaging apparatus according to claim 1, further comprising counters respectively corresponding to each of the first to third decoders, and a control circuit for controlling the counters, wherein the control circuit operates to reset an entire image frame by setting, at an arbitrary value, an initial value of a count value to be supplied from each of the counters corresponding to each image frame, and by sequentially scanning, through each of the first to third decoders, the pixel rows based on each of the count values.

3. The solid-state imaging apparatus according to claim 2, wherein, when the control circuit sets a reading out region and a non-reading out region within the pixel region, the counter corresponding to the first decoder operates to reset the non-reading out region within the pixel region, after setting the initial value at a value corresponding to a top pixel row of the reading out region and completing an operation to reset the reading out region.

4. The solid-state imaging apparatus according to claim 3, wherein the counter supplies the first decoder or the second decoder with the count value so as to select at least once every one of the plurality of pixels, one frame by one frame.

5. The solid-state imaging apparatus according to claim 1, wherein the reset switch discharges the electric charge of the corresponding photoelectric conversion element, through the corresponding transfer switch.

6. A solid-state imaging apparatus comprising:
a pixel region including a plurality of pixels arranged in a matrix, each pixel including a photoelectric conversion element and a reset switch for discharging an electric charge of the photoelectric conversion element, wherein the pixel region includes first and second pixel regions;
a first scanning circuit for supplying a reset control signal for controlling an operation of the reset switches, wherein the pixel region and the first scanning circuit are disposed on a semiconductor substrate, and wherein the first scanning circuit includes a first decoder for controlling an operation of a reset switch arranged in the first pixel region, and a second decoder for controlling an operation of a reset switch arranged in the second pixel region;
an optical black region arranged adjacent to the pixel region; and
a third decoder operates to reset the optical black region.

7. A solid-state imaging apparatus comprising:
a pixel region including a plurality of pixels arranged in a matrix, each pixel including a photoelectric conversion element and a reset switch for discharging an electric charge of the photoelectric conversion element, wherein the pixel region includes first and second pixel regions; and
a first scanning circuit for supplying a reset control signal for controlling an operation of the reset switches,
wherein the pixel region and the first scanning circuit are disposed on a semiconductor substrate,
wherein the first scanning circuit includes a first decoder for controlling an operation of a reset switch arranged in the first pixel region, and a second decoder for controlling an operation of a reset switch arranged in the second pixel region, and
wherein different image frames are reset by turning on (or enabling) simultaneously the reset switches arranged respectively in the first and second pixel regions.

8. The solid-state imaging apparatus according to claim 7, wherein the first and second decoders enable switches arranged in the first and second pixel regions simultaneously.

9. The solid-state imaging apparatus according to claim 7, wherein each pixel further includes:
an amplifier unit for amplifying a signal based on the electric charge of the photoelectric conversion element; and
a transfer switch for transferring to an input portion of the amplifier unit, and wherein the amplifier unit and the transfer switch are arranged in the pixel region.

10. The solid-state imaging apparatus according to claim 9, further comprising:
a second scanning circuit for supplying a transfer control signal for controlling an operation of the transfer switches, wherein the second scanning circuit includes a third decoder for generating the transfer control signal; and
a logic circuit for supplying one or more pixel rows with the reset control signal and the transfer control signal, respectively, responsive to a pulse from the second decoder and a pulse from the third decoder.

11. The solid-state imaging apparatus according to claim 10, further comprising:
counters respectively corresponding to each of the first to third decoders, and
a control circuit for controlling the counters,
wherein the control circuit operates to reset an entire image frame by setting, at an arbitrary value, an initial value of a count value to be supplied from each of the counters corresponding to each of the first to third decoders, and by sequentially scanning, through each of the first to third decoders, the pixel rows based on each of the count values.

12. The solid-state imaging apparatus according to claim 11, wherein, when the control circuit sets a reading out region and a non-reading out region within the pixel region, a counter corresponding to the first decoder operates to reset the non-reading out region within the pixel region, after setting the initial value at a value corresponding to a top pixel row of the reading out region and completing an operation to reset the reading out region.

13. The solid-state imaging apparatus according to claim 12, wherein the counter operates to supply the first decoder or the second decoder with the count value so as to select at least once every one of the plurality of pixels, one frame by one frame.

14. The solid-state imaging apparatus according to claim 7, further comprising:
an optical black region arranged adjacent to the pixel region, and
a third decoder that operates to reset the optical black region.

* * * * *